United States Patent
Tanimura et al.

(10) Patent No.: US 11,309,546 B2
(45) Date of Patent: Apr. 19, 2022

(54) GAS DIFFUSION ELECTRODE, METHOD FOR MANUFACTURING GAS DIFFUSION ELECTRODE, MEMBRANE ELECTRODE ASSEMBLY, AND FUEL CELL

(71) Applicant: Toray Industries, Inc., Tokyo (JP)

(72) Inventors: Yasuaki Tanimura, Otsu (JP); Yasutaka Okano, Otsu (JP); Masamichi Utsunomiya, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/289,027

(22) PCT Filed: Nov. 5, 2019

(86) PCT No.: PCT/JP2019/043232
§ 371 (c)(1),
(2) Date: Apr. 27, 2021

(87) PCT Pub. No.: WO2020/100649
PCT Pub. Date: May 22, 2020

(65) Prior Publication Data
US 2022/0006097 A1    Jan. 6, 2022

(30) Foreign Application Priority Data

Nov. 12, 2018 (JP) .............................. JP2018-212176

(51) Int. Cl.
*H01M 4/86* (2006.01)
*H01M 8/1004* (2016.01)
*H01M 4/88* (2006.01)

(52) U.S. Cl.
CPC ....... *H01M 4/8626* (2013.01); *H01M 4/8807* (2013.01); *H01M 8/1004* (2013.01)

(58) Field of Classification Search
CPC . H01M 4/8626; H01M 4/8807; H01M 8/1004
See application file for complete search history.

(56) References Cited

FOREIGN PATENT DOCUMENTS

| JP | 2006294559 A | 10/2006 |
| JP | 2010-092609 | * 4/2010 |

(Continued)

OTHER PUBLICATIONS

International Search Report and Written Opinion for International Application No. PCT/JP2019/043232, dated Jan. 28, 2020, 5 pages.

*Primary Examiner* — Brittany L Raymond
(74) *Attorney, Agent, or Firm* — RatnerPrestia (57) ABSTRACT

A low-cost gas diffusion electrode is described that overcomes defects of conventional techniques, that achieves both dry-up resistance and flooding resistance, and that has satisfactory power generation performance, where the gas diffusion electrode includes a conductive porous substrate, and a microporous layer containing conductive fine particles and provided on at least one surface of the conductive porous substrate. The gas diffusion electrode has, based on the number of fine pores having an area of 0.25 µm² or more that are observed in a cross section of the microporous layer in a thickness direction, a percentage of fine pores having a circularity of 0.5 or more of 50% or more and 100% or less.

9 Claims, 2 Drawing Sheets

(56) References Cited

FOREIGN PATENT DOCUMENTS

| JP | 2010092609 A | | 4/2010 |
|---|---|---|---|
| JP | 2013020940 A | | 1/2013 |
| JP | 2015-015226 | * | 1/2015 |
| JP | 2015015226 A | | 1/2015 |

* cited by examiner

GAS DIFFUSION ELECTRODE, METHOD FOR MANUFACTURING GAS DIFFUSION ELECTRODE, MEMBRANE ELECTRODE ASSEMBLY, AND FUEL CELL

CROSS REFERENCE TO RELATED APPLICATIONS

This is the U.S. National Phase application of PCT/JP2019/043232, filed Nov. 5, 2019, which claims priority to Japanese Patent Application No 2018-212176, filed Nov. 12, 2018, the disclosures of these applications being incorporated herein by reference in their entireties for all purposes.

FIELD OF THE INVENTION

The present invention relates to a gas diffusion electrode used in a fuel cell, and more particularly to a gas diffusion electrode that can be used in a polymer electrolyte fuel cell used as a power source for a fuel cell vehicle and the like.

BACKGROUND OF THE INVENTION

A fuel cell is a mechanism for electrically extracting energy generated when hydrogen is allowed to react with oxygen to produce water, and is expected to be widely used as clean energy because of its high energy efficiency and the fact that it discharges only water. An electrode used in a polymer electrolyte fuel cell is sandwiched between two separators and disposed therebetween in the polymer electrolyte fuel cell, and has a structure including a polymer electrolyte membrane, catalyst layers formed on both surfaces of the polymer electrolyte membrane, and gas diffusion electrodes formed outside the catalyst layers. As the performance required of the gas diffusion electrode, for example, there are gas diffusivity, electrical conductivity for collecting electricity generated in the catalyst layer, and water drainability for efficiently removing moisture generated on the surface of the catalyst layer. In order to obtain such a gas diffusion electrode, in general, a conductive porous substrate having both gas diffusivity and electrical conductivity is used.

Specific examples of the conductive porous substrate include carbon felt, carbon paper, and carbon cloth made of carbon fibers. Among them, carbon paper is most preferable from the viewpoint of mechanical strength and the like.

Unfortunately, the following problems are known about the gas diffusion electrode: (1) when the polymer electrolyte fuel cell is operated in a high-humidity and high-current-density region, the gas diffusion electrode may be blocked by liquid water generated in a large amount, and a gas (oxygen or hydrogen) may be insufficiently supplied, resulting in deteriorated power generation performance (hereinafter referred to as flooding); and (2) when the polymer electrolyte fuel cell is operated in an atmosphere with a relatively high temperature of 80° C. or more and a low humidity, the electrolyte membrane may dry due to water vapor diffusion, and proton conductivity may decrease, resulting in deteriorated power generation performance (hereinafter referred to as dry-up). Many attempts have been made to solve these problems (1) and (2). As a fundamental solution to these problems, there has been employed a method of forming a microporous layer on a surface of the conductive porous substrate, and forming pores in the microporous layer to improve gas diffusivity and water drainability.

In Patent Document 1, a gas diffusion electrode having pores formed inside a microporous layer is proposed. The pores are formed by applying a microporous layer precursor containing a material that vanishes in a sintering step (hereinafter, the material is referred to as a vanishing material), such as a biodegradable polymer, onto a conductive porous substrate impregnated with a porous carbon material, and sintering the applied precursor. With use of a fuel cell including the gas diffusion electrode, it is possible to form a pore structure in the microporous layer, and to expect improvement of the performance to some degree.

In Patent Document 2, a multilayered microporous layer is provided, the amount of binder is varied among the layers, and flaky graphite having a large diameter is added to the microporous layer to improve the gas diffusivity and water drainability.

PATENT DOCUMENTS

Patent Document 1: Japanese Patent Laid-open Publication No. 2006-294559
Patent Document 2: Japanese Patent Laid-open Publication No. 2013-020940

SUMMARY OF THE INVENTION

In Patent Document 1, it is impossible to control the shape of the pores formed in the microporous layer and to achieve sufficient performance, in particular, water drainability, and the improvement of power generation performance is also insufficient.

In Patent Document 2, it is impossible to form an effective fine pore structure in the microporous layer, and sufficient power generation performance is not achieved as in the technique of Patent Document 1.

In other words, with the techniques disclosed in Patent Documents 1 and 2, it is difficult to achieve both flooding resistance and dry-up resistance, and it is also difficult to achieve high performance over a wide temperature range in applications in which a large output is required, such as a case where the gas diffusion electrode is used in a fuel cell vehicle.

Furthermore, in order to achieve wide use of fuel cells or fuel cell vehicles, it is indispensable to manufacture high-performance fuel cells at low cost. Therefore, cost reduction is required for all the fuel cell members, and the gas diffusion electrodes are no exception. An object of the present invention is to provide an inexpensive gas diffusion electrode that overcomes defects of conventional techniques, that achieves both dry-up resistance and flooding resistance, and that has high power generation performance.

In order to solve the above-mentioned problems, the present invention employs the following means.

The present invention employs a gas diffusion electrode including a conductive porous substrate, and a microporous layer containing conductive fine particles and provided on at least one surface of the conductive porous substrate, the gas diffusion electrode having, based on the number of fine pores having an area of 0.25 $\mu m^2$ or more that are observed in a cross section of the microporous layer in a thickness direction, a percentage of fine pores having a circularity of 0.5 or more of 50% or more and 100% or less.

Use of the gas diffusion electrode of the present invention can achieve both flooding resistance and dry-up resistance because the gas diffusion electrode has high gas diffusivity and satisfactory water drainability, and therefore, it is possible to provide an inexpensive fuel cell that has high power generation performance in a wide temperature range.

DETAILED DESCRIPTION OF EMBODIMENTS OF THE INVENTION

The gas diffusion electrode of the present invention includes a conductive porous substrate, and a microporous layer provided on at least one surface of the conductive porous substrate.

The gas diffusion electrode is laminated on at least one side of a catalyst-coated electrolyte membrane, and can be used for forming a membrane electrode assembly. The membrane electrode assembly can be sandwiched and laminated between separators to form a fuel cell.

<Gas Diffusion Electrode>

Figure 1:
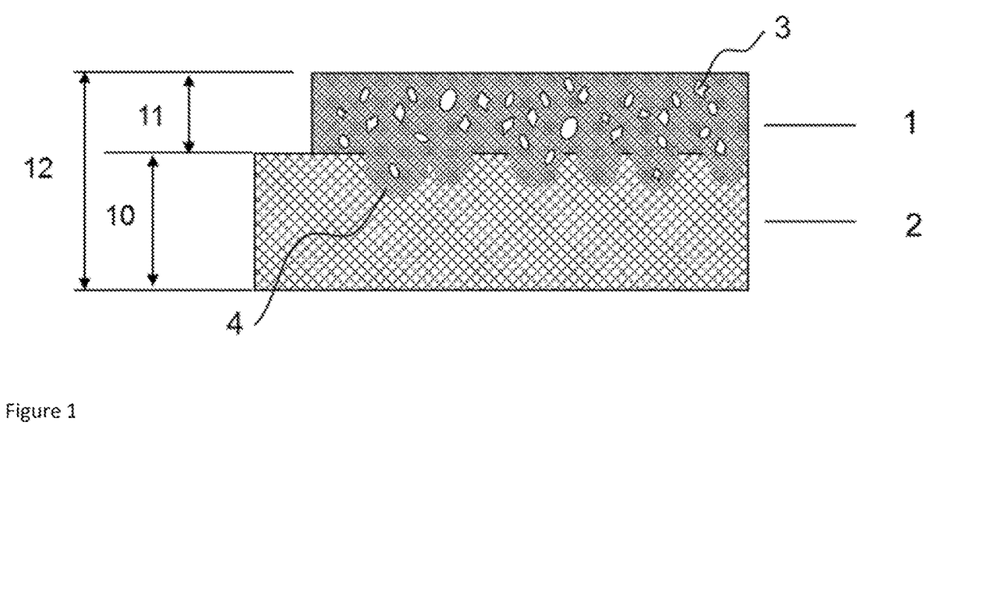
FIG. 1 is a schematic view showing a configuration of a gas diffusion electrode of the present invention.

In a polymer electrolyte fuel cell, the gas diffusion electrode is required to have high gas diffusivity for diffusing a gas supplied from a separator to a catalyst layer, high water drainability for discharging water produced by an electrochemical reaction to the separator, and high electrical conductivity for extracting the generated current. For this purpose, as an example, a gas diffusion electrode as shown in FIG. 1 can be used. A gas diffusion electrode includes a conductive porous substrate 2, which is a substrate made of a porous material having electrical conductivity and usually having a peak of fine pore diameter in the range of 10 µm or more and 100 µm or less, and a microporous layer 1 having fine pores having a diameter in the range of less than 10 µm. Herein, the diameter of fine pores in the conductive porous substrate, the diameter of fine pores in the microporous layer, and the distribution of the fine pore diameters can be determined by the fine pore diameter distribution measurement with a mercury porosimeter.

<Conductive Porous Substrate>

Preferable specific examples of the conductive porous substrate include porous substrates containing carbon fibers, such as a carbon fiber woven fabric, a carbon fiber paper sheet, a carbon fiber nonwoven fabric, carbon felt, carbon paper, and carbon cloth, and metal porous substrates such as a foamed sintered metal, a metal mesh, and an expanded metal. Among them, a carbon fiber-containing porous substrate, such as carbon felt, carbon paper, and carbon cloth is preferably used because of its excellent corrosion resistance, and it is further preferable to use carbon paper that is a substrate obtained by binding a carbon fiber paper sheet with a carbide because of its excellent properties of absorbing the dimensional change in the thickness direction of the electrolyte membrane, that is, "spring properties".

In the present invention, in order to increase the gas diffusivity of the gas diffusion electrode and improve the power generation performance of the fuel cell as much as possible, the conductive porous substrate preferably has a percentage of voids of 80% or more, and more preferably 85% or more. The upper limit of the percentage of voids is preferably 95% or less in order to maintain the structure of the conductive porous substrate.

Further, the gas diffusivity of the gas diffusion electrode can be increased also by reducing the thickness of the conductive porous substrate. Therefore, the thickness of the conductive porous substrate is preferably 220 µm or less, more preferably 160 µm or less, and still more preferably 130 µm or less. Meanwhile, in order to maintain mechanical strength and facilitate handling in the manufacturing process, usually, the thickness of the conductive porous substrate is preferably 70 µm or more.

In order to efficiently manufacture a gas diffusion electrode using the above-mentioned conductive porous substrate, it is preferable to unwind the conductive porous substrate wound up into a long roll, and continuously form the microporous layer until the conductive porous substrate is wound up.

In the present invention, a conductive porous substrate subjected to a water repellent treatment by the addition of a fluororesin is preferably used. Since a fluororesin acts as a water repellent resin, the conductive porous substrate used in the present invention preferably contains a water repellent resin such as a fluororesin. Examples of the water repellent resin contained in the conductive porous substrate, that is, the fluororesin contained in the conductive porous substrate include PTFE (polytetrafluoroethylene) (for example, "Teflon®"), FEP (an ethylene tetrafluoride-propylene hexafluoride copolymer), PFA (a perfluoroalkoxy fluororesin), ETFE (an ethylene-tetrafluoroethylene copolymer), PVDF (polyvinylidene fluoride), and PVF (polyvinyl fluoride). PTFE that exhibits high water repellency, and FEP are preferable.

The amount of the water repellent resin is not particularly limited, but is appropriately 0.1% by mass or more and 20% by mass or less in 100% by mass in total of the conductive porous substrate. When the amount of the water repellent resin is 0.1% by mass or more, sufficient water repellency is exhibited. When the amount of the water repellent resin is 20% by mass or less, it is possible to acquire fine pores that serve as gas diffusion paths or water drainage paths while exhibiting water repellency.

A method of subjecting the conductive porous substrate to a water repellent treatment may be a coating technique of applying a water repellent resin to the conductive porous substrate by die coating, spray coating, or the like, in addition to a generally known treatment technique of immersing the conductive porous substrate in a dispersion containing a water repellent resin. Further, processing by a dry process such as sputtering of a fluororesin can also be applied. After the water repellent treatment, if necessary, a drying step, and further a sintering step may be added.

<Microporous Layer>

Then, the microporous layer will be described. In the present invention, the gas diffusion electrode includes one or a plurality of microporous layers provided on at least one surface of the conductive porous substrate. The functions of the microporous layer include (1) to serve as a buffer for the conductive porous substrate having irregularities to protect the catalyst, (2) to smoothen the coarse surface of the conductive porous substrate, (3) an effect of preventing the condensation of water vapor generated at the cathode, and (4) exchange of substances, such as supply of a fuel gas and an oxygen gas, and discharge of reaction products.

In the present invention, a thickness 11 of the microporous layer shown in FIG. 1 is preferably 10 µm or more and 60 µm or less in order to cover and smoothen the roughened surface of the conductive porous substrate. As shown in FIG. 1, the thickness 11 of the microporous layer is a thickness obtained by subtracting a thickness 10 of the conductive porous substrate from a thickness 12 of the gas diffusion electrode.

When the thickness 11 of the microporous layer is 10 μm or more, the above-mentioned smoothening effect can be improved. When the thickness 11 of the microporous layer is 60 μm or less, the gas diffusivity (permeability) of the gas diffusion electrode itself can be increased, and the electrical resistance can be reduced, so that high power generation performance can be obtained. From the viewpoint of increasing the gas diffusivity or reducing the electrical resistance, the thickness 11 of the microporous layer is preferably 50 μm or less, and more preferably 40 μm or less.

The thickness 12 of the gas diffusion electrode and the thickness 10 of the conductive porous substrate can be measured with a micrometer or the like with a load of 0.15 MPa being applied to the substrate. The thickness 11 of the microporous layer can be obtained by subtracting the thickness 10 of the conductive porous substrate from the thickness 12 of the gas diffusion electrode.

Due to the presence of fine pores in the microporous layer, a gas (oxygen or hydrogen) is supplied, and the generated water vapor and water can be discharged. An increase of the diffusion of a gas (oxygen or hydrogen) or water through the fine pores can promote the exchange of substances necessary for power generation and enhance the power generation performance. Therefore, it is important to precisely control the shape of the fine pores. Examples of the method of precisely controlling the fine pore shape include a method of mixing bubbles, a method of vanishing particles in the drying and sintering steps to make the space occupied by the particles into fine pores, and a method using the aggregation of conductive fine particles in a microporous layer forming coating liquid to form fine pores between aggregated particles.

Methods for obtaining the fine pore diameter as well as characteristic values for determining the fine pore shape will be described below. First, a gas diffusion electrode including a conductive porous substrate and at least one microporous layer is cut at an arbitrary position in the thickness direction (direction perpendicular to a surface) of the gas diffusion electrode using an ion-milling system such as IM4000 manufactured by Hitachi High-Technologies Corporation. Then, the cross section in the thickness direction is observed with a scanning electron microscope (SEM). Then, the cross-sectional SEM image is binarized to extract fine pores, and fine pores having an area of 0.25 μm$^2$ or more are defined as "large fine pores". The number of pixels of the large fine pores is measured.

Further, the large fine pores having various shapes can be approximated as ellipses having a fine pore area same as that of the large fine pores by the minimum approximation method to obtain the circularity and the major axis orientation angle of the ellipses. The larger the circularity of the large fine pores is, the more preferable it is because the easier it is for a gas (oxygen or hydrogen) and water to pass through the large fine pores. Specifically, it is preferable that the gas diffusion electrode have, based on the number of large fine pores, a percentage of fine pores having a circularity of 0.5 or more, in which the movement of a gas or a liquid is promoted (the percentage is referred to as a percentage of circular fine pores), of 50% or more. The percentage of circular fine pores is more preferably 60% or more. The upper limit of the percentage of circular fine pores is 100%. Herein, the circularity is a numerical value defined by $4\pi S/L^2$ wherein S is the area of a fine pore in the image, and L is the peripheral length of the fine pore. The closer the numerical value is to 1, the more circular the fine pore is.

Figure 2:
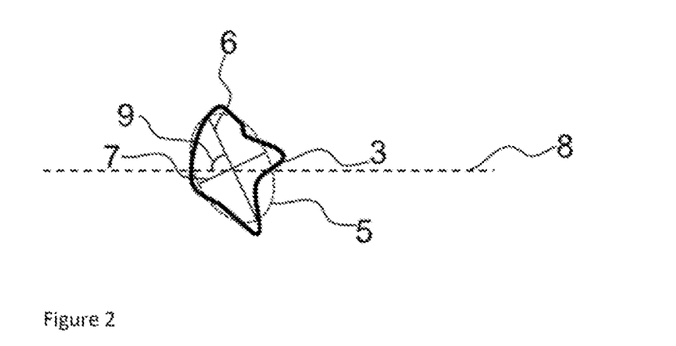
FIG. 2 is a schematic view showing a method of elliptical approximation of fine pore diameter in a microporous layer, and an angle of a major axis.

In addition, when the major axes of the large fine pores are oriented in the direction perpendicular to a surface of the microporous layer, the large fine pores can promote mass transfer, especially liquid discharge from the inside of the microporous layer toward the electrode substrate in the perpendicular direction, so that flooding resistance under humidified conditions is improved. Specifically, as for an elliptical approximate shape 5 of a fine pore, which is a large fine pore 3 as shown in FIG. 2, it is preferable that the gas diffusion electrode have, based on the number of all the fine pores in the microporous layer, a percentage of fine pores having an orientation angle θ, that is, an angle 9 of 45° or more and 90° or less (the fine pores are referred to as large fine pores oriented in the perpendicular direction), in other words, a percentage of large fine pores oriented in the perpendicular direction, of 40% or more, and more preferably 50% or more, wherein the angle θ is an angle between a major axis 6 of the elliptical approximate shape, and an in-plane direction 8 (direction perpendicular to the perpendicular direction). The upper limit of the percentage of large fine pores oriented in the perpendicular direction is 100%.

Further, the larger the number of large fine pores present in the microporous layer is, the more desirable it is, because the substance diffusion paths increase, and thus the power generation performance is improved under both dry and humidified conditions. Therefore, it is preferable that the number density of the large fine pores, that is, the large pore density in a cross section of the microporous layer in the perpendicular direction is preferably 0.15/μm$^2$ or more, more preferably 0.2/μm$^2$ or more, and still more preferably 0.3/μm$^2$ or more. When the large pore density is 0.15/μm$^2$ or more, high dry-up resistance and high flooding resistance can be maintained.

<Volume Percentage>

In addition, the volume percentage of the fine pores corresponding to the large fine pores in the microporous layer also has a great influence on the exchange of substances. The fine pore volume can be measured using a mercury intrusion method or the like. Specifically, it is possible to employ a method of applying a pressure to mercury to intrude mercury into the fine pores, and obtaining the fine pore diameter distribution from the pressure and the amount of intruded mercury. The fine pore volume for each fine pore diameter can be grasped by such a method. In the present invention, the microporous layer is a region having fine pores having a diameter of less than 10 μm. In the region, the range of fine pore diameter of the large fine pores is usually 0.5 μm or more and less than 10 μm. The percentage of the volume of large fine pores having a fine pore diameter within the above-mentioned range in the fine pore volume of the entire microporous layer, that is, the volume percentage of large fine pores is preferably 30% or more. In order to improve the flooding resistance under humidified conditions, the volume percentage of large fine pores is preferably 40% or more, and more preferably 45% or more. Meanwhile, the microporous layer is pressurized at about 1 to 3 MPa when the gas diffusion electrode including the microporous layer generates power. In this case, in order to maintain the large fine pores and acquire a satisfactory shape, the volume percentage of large fine pores is preferably less than 70%, and more preferably 65% or less.

The microporous layer is a layer containing conductive fine particles such as carbon black, carbon nanotubes, carbon nanofibers, chopped carbon fibers, graphene, and graphite. The smaller the primary particle size of the conductive fine particles contained in the microporous layer is, the smoother the contact interface between the microporous layer and the catalyst layer is, and the better the contact can be realized. Therefore, the primary particle size is preferably 0.3 μm or less, and a primary particle size of 0.1 μm or less can provide a more satisfactory contact interface. Carbon black is preferably used as the conductive fine particles from the viewpoint of its low cost, safety, and stability of the product quality. As the carbon black contained in the microporous layer, acetylene black is preferably used from the viewpoint that it has a primary particle size of 0.1 μm or less, contains slight amount of impurities, and hardly lowers the activity of the catalyst. In addition, the ash content can be mentioned as a measure of the content of impurities in carbon black. It is preferable to use carbon black having an ash content of 0.1% by mass or less. The lower the ash content in carbon black is, the more preferable it is. Carbon black having an ash content of 0% by mass, that is, carbon black containing no ash is particularly preferable.

Further, a pore-forming agent for forming large fine pores, which plays an important role in gas diffusivity and water drainability, can be added to the microporous layer. As for a technique for forming pores, it is possible to use a vanishing material that vanishes after being added to the microporous layer due to decomposition, sublimation, shrinkage, or the like by heating, and a method of forming voids using aggregation of conductive fine particles can also be mentioned as an example. It is desirable that the vanishing material vanish under temperature conditions between the drying temperature and the sintering temperature. For example, an acrylic resin, a styrene resin, starch, cellulose, a polylactic acid resin, a sublimable low molecular weight substance, a microballoon, and the like can be used. Herein, the sublimable low molecular weight substance is a low molecular weight organic powder usually having a molecular weight of 1,000 or less, and sublimes and vanishes at the sintering temperature. Examples of the sublimable low molecular weight substance include anthracene, pentacene, and phenanthrene.

When the particles used as the vanishing material have an aspect ratio close to 1, it is easy to ensure a large circularity of the large fine pores. On the contrary, when the particles have a large aspect ratio, the microporous layer forming coating liquid can be applied utilizing the orientation of the vanishing material so that the major axes of the fine pores may be arranged in the direction perpendicular to a surface of the microporous layer, and thus a large percentage of large fine pores oriented in the perpendicular direction can be ensured after the sintering. For this reason, the aspect ratio of the particles used as the vanishing material is preferably 1 or more, while it is preferably 10 or less. In order to also achieve the circularity, the aspect ratio is more preferably 4 or less. Further, as for the size of the vanishing material, the particles preferably have a primary particle size of 1 μm or more, and more preferably 1.5 μm or more in order to form large fine pores. Meanwhile, in order to reduce the generation of cracks in the microporous layer and the retention of droplets in the large fine pores, the primary particle size is preferably 4 μm or less, and more preferably 3 μm or less.

In addition, the vanishing material is preferably a material that easily forms pores during the sintering and preferably having a carbonization yield of 20% or less at 350° C., that is, a general sintering condition. Examples of such vanishing material include polymethyl methacrylate (PMMA) and an azodicarbonamide resin. This is because if a vanishing material having a carbonization yield of more than 20% is used, the vanishing material may produce a hydrophilic carbide after the sintering, and the pores themselves may retain water and inhibit the discharge of water. The carbonization yield can be measured, for example, using a TGA device such as EXTRA TGA6200 manufactured by SII NanoTechnology Inc. Specifically, the temperature is raised from 50° C. to 350° C. at a heating rate of 2° C./min in the atmosphere, and held at 350° C. for 10 minutes. The carbonization yield is obtained by dividing the mass of the vanishing material after being held at 350° C. by the initial mass thereof at 50° C., and multiplying the product by 100.

In addition, the microporous layer is required to have properties such as electrical conductivity, gas diffusivity, water drainability, moisture retention, and thermal conductivity, as well as resistance to strong acids on the anode side and oxidation resistance on the cathode side inside a fuel cell. Therefore, in addition to the conductive fine particles, the microporous layer preferably contains a water repellent resin such as a fluororesin. Examples of the preferable fluororesin contained in the microporous layer include PTFE, FEP, PFA, ETFE and the like similarly to the case of the fluororesin preferably used for subjecting the conductive porous substrate to a water repellent treatment. PTFE having particularly high water repellency, or FEP is preferable.

In order to form the microporous layer, in general, a coating liquid for forming the microporous layer, that is, a microporous layer forming coating liquid (hereinafter referred to as a microporous layer coating liquid) is applied to the conductive porous substrate. The microporous layer coating liquid usually contains the above-mentioned conductive fine particles and a dispersion medium such as water or an alcohol, and often contains a surfactant or the like as a dispersant for dispersing the conductive fine particles therein. When a water repellent resin is incorporated into the microporous layer, it is preferable to previously add the water repellent resin to the microporous layer coating liquid.

From the viewpoint of productivity, the concentration of the conductive fine particles in the microporous layer coating liquid is preferably 5% by mass or more, and more preferably 10% by mass or more. There is no upper limit of the concentration of the conductive fine particles as long as preferable viscosity, dispersion stability of the conductive fine particles, and coating properties of the coating liquid are achieved. In practice, a concentration of the conductive fine particles in the microporous layer coating liquid of 50% by mass or less ensures the coating properties of the coating liquid. In the study made by the present inventors, especially when acetylene black is used as the conductive fine particles and in the case of an aqueous microporous layer coating liquid having a concentration of acetylene black of 25% by mass or less, it is possible to prevent the reaggregation of acetylene black particles, provide a stable viscosity of the microporous layer coating liquid, and ensure the coating properties of the coating liquid.

Further, addition of a dispersant or a thickener to the microporous layer coating liquid provides the dispersion stability of the conductive fine particles and the coating properties of the coating liquid. In addition, the dispersed state of the conductive fine particles in the coating liquid may be controlled according to the method of mixing the conductive fine particles with the dispersion medium, percentages of the dispersant and the thickener, adjustment of the shear rate and dispersion time during dispersion, and adjustment of the dispersion uniformity by the shape of the stirring blade. Owing to the above-mentioned control, it is possible to produce a coating liquid in which aggregates are formed, and to change the size and number of large fine pores utilizing the voids between the aggregates. As will be described later in the examples, even when the coating liquids used have the same composition, the kneading time for dispersion can be adjusted to adjust the circularity and orientation of the fine pores, and thus achieve satisfactory results.

Examples of a method for forming the microporous layer on the conductive porous substrate include a transfer method in which the microporous layer coating liquid is once applied to a substrate such as a PET film, a surface of the substrate on the side of the microporous layer is pressure-bonded onto the conductive porous substrate, and the substrate film is separated; and a direct coating method in which the microporous layer coating liquid is applied to the conductive porous substrate. The direct coating method is preferable from the viewpoint of ease of the process.

<Application>

The microporous layer coating liquid can be applied to the conductive porous substrate using a variety of commercially available coating apparatuses. The coating method may be screen printing, rotary screen printing, spraying, intaglio printing, gravure printing, die coater coating, bar coater coating, blade coater coating, roll knife coater coating, or the like. The microporous layer coating liquid is preferably applied using a die coater because the coating amount can be quantified regardless of the surface roughness of the conductive porous substrate. Further, when the coating surface is required to be smooth in order to have high adhesion to the catalyst layer in a fuel cell incorporating the gas diffusion electrode, the microporous layer coating liquid is preferably applied using a blade coater or a roll knife coater. The above-mentioned coating methods are presented solely for the illustration purpose, and the coating method is not necessarily limited thereto. It is also possible to devise the coating method in order to increase the components of large fine pores oriented in the direction perpendicular to a surface of the microporous layer in the present invention. For example, at the time of application of the coating liquid, it is possible to discharge the coating liquid at an increased discharge pressure near the surface of the conductive porous substrate so that a large amount of components may flow in the perpendicular direction at the surface of the conductive porous substrate, whereby an increased number of large fine pores may be oriented in the perpendicular direction.

After the application of the microporous layer coating liquid, if necessary, the dispersion medium (in the case of an aqueous microporous layer coating liquid, water) in the microporous layer coating liquid is removed by drying. When the dispersion medium is water, the temperature of drying after the application is desirably from room temperature (around 20° C.) to 150° C. or less, and more preferably 60° C. or more and 120° C. or less. The dispersion medium (for example, water) may be dried in a batch manner in the subsequent sintering step.

After the application of the microporous layer coating liquid, the microporous layer coating liquid is generally sintered for the purpose of removing the surfactant used in the microporous layer coating liquid, and dissolving the water repellent resin once to bind the conductive fine particles. The sintering temperature depends on the boiling point or the decomposition temperature of the surfactant added, but it is preferable to sinter the coating liquid at a temperature of 250° C. or more and 400° C. or less. If the sintering temperature is less than 250° C., the surfactant cannot be sufficiently removed, or it takes a great deal of time to completely remove the surfactant, whereas if the sintering temperature exceeds 400° C., the water repellent resin may be decomposed.

The sintering time is as short as possible from the viewpoint of productivity, and is preferably within 20 minutes, more preferably within 10 minutes, and still more preferably within 5 minutes. However, if the coating liquid is sintered rapidly in a very short time, vapor of the surfactant or decomposition products may be generated rapidly, and there is a risk of ignition when the coating liquid is sintered in the atmosphere. The optimum temperature and time for the sintering are selected in consideration of the melting point or decomposition temperature of the water repellent resin, and the decomposition temperature of the surfactant.

<Membrane Electrode Assembly>

In the present invention, a membrane electrode assembly can be formed by joining the above-mentioned gas diffusion electrode to at least one surface of a solid polymer electrolyte membrane having a catalyst layer. In this case, the microporous layer of the gas diffusion electrode is disposed on the catalyst layer side, so that it is possible to facilitate the back diffusion of the generated water, increase the contact area between the catalyst layer and the gas diffusion electrode, and reduce the contact electrical resistance. For this purpose, it is necessary to maintain satisfactory contact between the solid polymer electrolyte membrane and the catalyst layer, and between the catalyst layer and the microporous layer, and it is desirable to increase, after laminating the electrolyte membrane, the catalyst layer, and the gas diffusion electrode, the degree of adhesion at the interfaces by pressurization and heating. It is also possible to form various functional layers, such as an adhesive layer for increasing the adhesion between the layers and an anti-coagulation layer for enabling low-temperature start-up, at the interfaces between the layers. The catalyst layer is composed of a layer containing a solid polymer electrolyte and catalyst-supported carbon. As the catalyst, platinum is usually used. In a fuel cell in which a carbon monoxide-containing reformed gas is fed to the anode, platinum and ruthenium are preferably used as catalysts of the anode. As the solid polymer electrolyte, a perfluorosulfonic acid-based polymer material having high proton conductivity, oxidation resistance, and heat resistance is preferably used.

<Fuel Cell>

The fuel cell of the present invention includes the above-mentioned membrane electrode assembly, and a separator provided over the membrane electrode assembly. Specifically, a separator is disposed on both sides of the above-mentioned membrane electrode assembly to form a fuel cell. Usually, a plurality of such membrane electrode assemblies, each sandwiched between separators with a gasket interposed between the membrane electrode assembly and the separator, are laminated to form a polymer electrolyte fuel cell. Herein, the separator generally has a function of supplying a fuel gas and an oxygen gas and discharging a reaction product, and has a flow path structure on the gas diffusion electrode side of a current collector. A current is extracted from current collectors at both ends of a single cell or a stacked structure to provide a function as a battery.

EXAMPLES

Hereinafter, the present invention will be concretely described by way of examples. The materials used in the examples, the method for manufacturing the conductive porous substrate, and the method for evaluating the battery performance of the fuel cell are shown below.

<Materials>

A: Conductive Porous Substrate

A polyacrylonitrile-based carbon fiber "TORAYCA®" T300-6K (average monofilament diameter: 7 μm, number of monofilaments: 6,000) manufactured by Toray Industries, Inc. as a raw material was bound using a carbide binder containing graphite to produce carbon paper having a thickness of 150 μm, a percentage of voids of 85%, and a basis weight of 40 g/m$^2$. The carbon paper was used as the conductive porous substrate.

B: Conductive Fine Particles

Carbon powder: carbon black, primary particle size: 0.045 μm

Carbon powder: artificial graphite, crushed product, primary particle size: 3 μm C: Water Repellent Resin "POLYFLON®" PTFE dispersion D-210 (a PTFE resin, manufactured by Daikin Industries, Ltd.)

D: Surfactant

"TRITON®" X-100 (manufactured by Nacalai Tesque, Inc.)

E: Pore-Forming Agent

Vanishing material: an azodicarbonamide resin, carbonization yield (350° C. for 10 minutes): 0.5%, aspect ratio: 3, average particle size: 3 μm Vanishing material: polymethyl methacrylate resin particles (spherical), carbonization yield (350° C. for 10 minutes): 0.5%, aspect ratio: 1, average particle size: 2 μm F: Purified Water was Used as a Dispersion Medium.

<Measurement of Thickness>

The thicknesses of the gas diffusion electrode and the conductive porous substrate were measured with a digital thickness meter "DIGIMICRO" manufactured by Nikon Corporation with a load of 0.15 MPa being applied to the substrate.

The thickness of the microporous layer was measured by applying the microporous layer coating liquid to the substrate and sintering the liquid to form a gas diffusion electrode, and then subtracting the thickness of the conductive porous substrate from the thickness of the gas diffusion electrode.

<Measurement of Circularity and Fine Pore Shape, Percentage of Large Fine Pores Oriented in Perpendicular Direction, and Large Pore Density>

Figure 3:
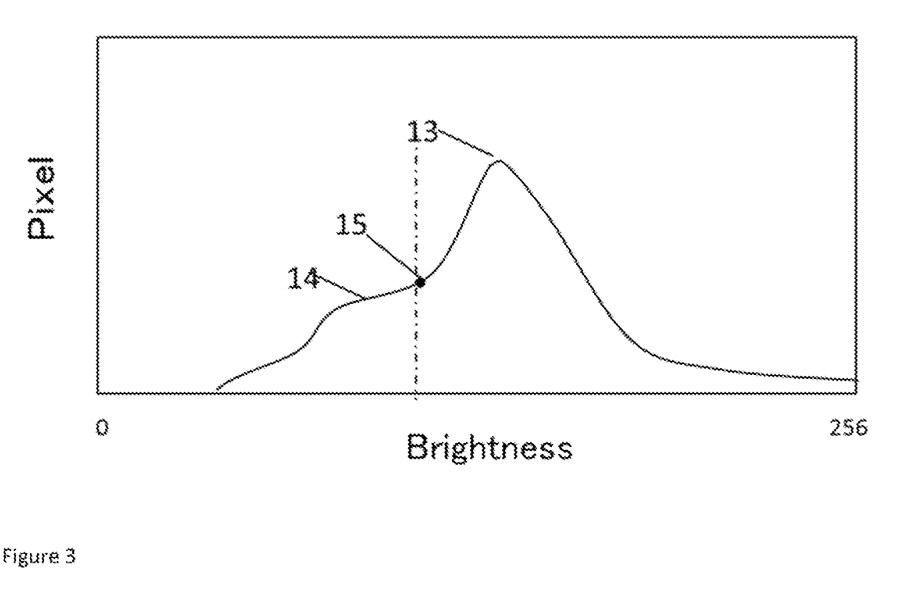
FIG. 3 is a schematic view of a method for obtaining a threshold in a binarization method on fine pores in the microporous layer.

The shape of the fine pores included in the microporous layer was evaluated by producing a cross section in the thickness direction of the gas diffusion electrode. The cross section of the gas diffusion electrode was produced using an ion-milling system IM4000 manufactured by Hitachi High-Technologies Corporation. The produced cross section was imaged with a scanning electron microscope S-4800 manufactured by Hitachi, Ltd. at a magnification of 2000×, and the brightness of a target sample was measured using image analysis software "ImageJ" to analyze the fine pores. FIG. 3 shows a schematic view of brightness distribution of the microporous layer alone in a cross-sectional image of the microporous layer in the thickness direction thereof. In the brightness distribution on a side 14 where the brightness decreases from a maximum point 13 of the brightness distribution, an inflection point 15 in the middle of a shoulder of the brightness distribution on the side where the brightness decreases from the maximum point was defined as the threshold for binarization. The area of a section where the brightness was smaller than the threshold was determined by particle analysis based on the premise that the section corresponds to fine pores. Cross-sectional images were observed at ten sites, and the number of fine pores of 0.25 μm$^2$ or more and less than 10 μm$^2$ in the total image area was counted to calculate the large pore density (number of pores/μm$^2$). Further, at the time of fine pore shape analysis, the fine pores were approximated as ellipses to obtain the percentage of large fine pores oriented in the perpendicular direction.

<Measurement of Fine Pore Volume>

The fine pore diameter and fine pore volume of the obtained gas diffusion electrode were measured using a mercury intrusion method. First, two 40-mm square pieces were cut out from the gas diffusion electrode, and the pieces were subjected to a measurement using AutoPore IV 9500 manufactured by SHIMADZU CORPORATION. From the results of measurement, a fine pore volume $V_{(0.5-10)}$ of fine pores having a diameter in the range of 0.5 μm or more and less than 10 μm, and a fine pore volume $V_{(0-10)}$ of fine pores having a diameter of less than 10 μm in the microporous layer were determined. The value of fine pore volume $V_{(0.5-10)}$/fine pore volume $V_{(0-10)}$ was determined as the volume percentage of large fine pores in the microporous layer.

<Evaluation of Power Generation Performance>

The obtained gas diffusion electrode was disposed on both sides of an electrolyte membrane/catalyst layer integrated product ("H500" manufactured by Greenerity GmbH) so that each catalyst layer of the integrated product might come into contact with one of the microporous layers, and the resulting laminate was hot-pressed at 110° C. at a pressure of 2 MPa for 20 minutes to produce a membrane electrode assembly (MEA). The membrane electrode assembly was incorporated into a single cell for a fuel cell, and adjusted for power generation so that the cell temperature might be 80° C., the fuel utilization efficiency might be 70%, the air utilization efficiency might be 40%, and the humidities of hydrogen on the anode and the air on the cathode might be 30% (dry conditions) and 100% (humidified conditions), respectively. The output voltage when the current density was 2 A/cm$^2$ under the humidity of 30% (dry conditions) was used as an index of dry-up resistance. The output voltage when the current density was 2 A/cm$^2$ under the humidity of 100% (humidified conditions) was used as an index of flooding resistance.

Example 1

Carbon paper wound up into a roll and having a thickness of 150 μm and a percentage of voids of 85% was immersed in an immersion tank filled with a water repellent resin dispersion while being transported using a winding transport device, whereby the carbon paper was subjected to a water repellent treatment. The carbon paper was dried in a dryer set at 100° C. and wound up with a winder to produce a water repellent conductive porous substrate. In the above-mentioned process, a PTFE dispersion D-210C was used as the water repellent resin dispersion, and a liquid obtained by diluting the PTFE dispersion D-210C with water so that the amount of the PTFE resin attached to the carbon paper might by 5% by mass was used for the immersion.

Then, the water repellent conductive porous substrate was unwound, and a microporous layer coating liquid was applied to a surface of the conductive porous substrate using a die coater. The resulting product was subjected to a hot air drying treatment at a temperature of 100° C. for 5 minutes and a sintering treatment at a temperature of 350° C. for 5 minutes and then wound up, whereby continuous formation was performed. In this process, a gap between a mouthpiece used for discharging the coating liquid from the die coater and the substrate was adjusted to adjust the discharge pressure at the mouthpiece. In the following, in Example 2 and subsequent examples, the discharge pressure at the mouthpiece of Example 1 is used as a reference (relative value 1.0). At the time of application of the microporous layer coating liquid, the application amount was adjusted so that the sintered microporous layer might have a basis weight of 15 g/m$^2$.

As shown in Table 1, for the microporous layer coating liquid, 10 parts by mass of carbon powder A "DENKA BLACK®" as conductive fine particles, 2.5 parts by mass of water repellent resin C: a PTFE dispersion ("POLYFLON®" D-210C), 14 parts by mass of surfactant D ("TRITON®" X-100), 3 parts by mass of pore-forming agent E (an azodicarbonamide resin), and 70 parts by mass of purified water were kneaded using a planetary mixer to prepare a coating liquid 1. The treatment time of kneading in the above-mentioned process was used as a reference (relative value 1.0).

Further, the gas diffusion electrode prepared as described above was thermocompression-bonded to both sides of an electrolyte membrane provided with a catalyst layer on both sides so that each microporous layer might come into contact with one of the catalyst layers, and the resulting product was incorporated into a single cell of a fuel cell and subjected to power generation performance (limiting current density) evaluation. Physical property values including those of other items were as shown in Table 2. A large fine pore structure having a larger circularity than that of Comparative Example 1 was obtained, and the power generation evaluation result was also satisfactory.

Example 2

A gas diffusion electrode was obtained in the same manner as in Example 1 except that the composition of the coating liquid was changed to a coating liquid 4 containing a pore-forming agent F (a spherical PMMA resin) instead of the pore-forming agent E shown in Table 1. The evaluation results are shown in Table 2. As compared with Example 1, the circularity of the fine pores was further increased, but the percentage of large fine pores oriented in the perpendicular direction was smaller. As a result, as compared with Example 1, the results of power generation were very satisfactory with improved dry-up resistance, but the flooding resistance was not improved.

Example 3

A gas diffusion electrode was obtained in the same manner as in Example 1 except that the discharge pressure at the mouthpiece was increased to a relative value of 1.5 at the time of application of the coating liquid. The evaluation results are shown in Table 2. As compared with Example 1, the percentage of large fine pores oriented in the perpendicular direction was larger. As a result, the flooding resistance was improved as compared with Example 1, and the results were very satisfactory.

Example 4

A gas diffusion electrode was obtained in the same manner as in Example 3 except that a coating liquid 2 shown in Table 1 with an increased amount of the vanishing material was used. The evaluation results are shown in Table 2. As compared with Examples 1 and 3, the percentage of large fine pores oriented in the perpendicular direction was larger. As a result, the dry-up resistance was also improved as compared with Example 3, and the results were very satisfactory.

Example 5

A gas diffusion electrode was obtained in the same manner as in Examples 3 and 4 except that a coating liquid 5 containing no vanishing material was used, and that the treatment time (relative value) of kneading the coating liquid was changed to 0.7. The evaluation results are shown in Table 2. As a result, all of the percentage of circular fine pores, the percentage of large fine pores oriented in the perpendicular direction, and the volume percentage of large fine pores significantly increased. As a result, both the dry-up resistance and the flooding resistance were improved as compared with Examples 3 and 4, and the results were very satisfactory.

Example 6

A gas diffusion electrode was obtained in the same manner as in Example 5 except that the treatment time (relative value) of kneading the coating liquid was changed to 0.5. The evaluation results are shown in Table 2. As a result, both the dry-up resistance and the flooding resistance were significantly improved as compared with Example 5, and the results were exceptionally satisfactory.

Example 7

A gas diffusion electrode was obtained in the same manner as in Example 6 except that the treatment time (relative value) of kneading the coating liquid was changed to 0.3, and that the relative value of the discharge pressure at the mouthpiece at the time of application of the coating liquid was changed to 2.0. The evaluation results are shown in Table 2. As a result, the percentage of large fine pores oriented in the perpendicular direction significantly increased as compared with Example 6. As a result, in the results of power generation, the flooding resistance was further improved, and both the dry-up resistance and the flooding resistance were exceptionally satisfactory.

Example 8

A gas diffusion electrode was obtained in the same manner as in Example 1 except that a coating liquid 3 shown in Table 1 with an increased amount of the vanishing material was used, and that the discharge pressure at the mouthpiece was increased to a relative value of 1.8 at the time of application of the coating liquid. The evaluation results are shown in Table 2. As compared with Example 1, all of the percentage of circular fine pores, the percentage of large fine pores oriented in the perpendicular direction, the large pore density, and the volume percentage of large fine pores increased. As a result, both the dry-up resistance and the flooding resistance were significantly improved as compared with Example 1, and the results were exceptionally satisfactory.

Example 9

A gas diffusion electrode was obtained in the same manner as in Example 8 except that the transport speed during the sintering was doubled to double the heating rate. The evaluation results are shown in Table 2. As compared with Example 8, the volume percentage of large fine pores was increased to 70% or more. However, it is assumed that the microporous layer was deformed by the compression during battery assembly, and the large fine pores inside the microporous layer shrunk. As a result, both the dry-up resistance and the flooding resistance in the results of power generation were inferior to those of Example 8, but the results were still satisfactory.

Example 10

A gas diffusion electrode was obtained in the same manner as in Example 4 except that a coating liquid 6 used contained a crushed product of artificial graphite having a primary particle size of 3 μm as conductive fine particles. The evaluation results are shown in Table 2. As a result, the percentage of circular fine pores, the percentage of large fine pores oriented in the perpendicular direction, and the volume percentage of large fine pores were sufficient, and the dry-up resistance and the flooding resistance were comparable to those in Example 1 although inferior to those in Example 4.

Comparative Example 1

A gas diffusion electrode was obtained in the same manner as in Example 1 except that the coating liquid 5 containing no vanishing material was used. The evaluation results are shown in Table 2. All of the percentage of circular fine pores, the percentage of large fine pores oriented in the perpendicular direction, the large pore density, and the volume percentage of large fine pores were insufficient. In addition, in the results of power generation, values of both the dry-up resistance and the flooding resistance were low and insufficient.

Comparative Example 2

A gas diffusion electrode was obtained in the same manner as in Comparative Example 1 except that the coating liquid 6 was used. The evaluation results are shown in Table 2. All of the percentage of circular fine pores, the percentage of large fine pores oriented in the perpendicular direction, the large pore density, and the volume percentage of large fine pores were improved as compared with Comparative Example 1, but the coating surface of the microporous layer was rough and did not make satisfactory contact with the catalyst layer. As a result, in the results of power generation, values of the dry-up resistance, and in particular the flooding resistance were low and insufficient.

TABLE 1

| Materials of microporous layer coating liquid | Coating liquid 1 | Coating liquid 2 | Coating liquid 3 | Coating liquid 4 | Coating liquid 5 | Coating liquid 6 |
|---|---|---|---|---|---|---|
| Carbon powder A "DENKA BLACK ®" (primary particle size: 0.045 μm) | 10 | 10 | 10 | 10 | 10 | — |
| Carbon powder B Artificial graphite, crushed product (primary particle size: 3 μm) | — | — | — | — | — | 10 |
| Water repellent resin C "POLYFLON ®" (a PTFE resin) | 2.5 | 2.5 | 2.5 | 2.5 | 2.5 | 2.5 |
| Surfactant D "TRITON ®" X-100 (a surfactant) | 14 | 14 | 14 | 14 | 14 | 14 |
| Pore-forming agent E an azodicarbonamide resin (primary particle size: 3 μm) | 3 | 4 | 6 | — | — | — |
| Pore-forming agent F PMMA particles (primary particle size: 2 μm) | — | — | — | 3 | — | — |
| Dispersion medium G purified water | 70 | 70 | 70 | 70 | 70 | 70 |

Unit: part

TABLE 2

| | | Example 1 | Example 2 | Example 3 | Example 4 | Example 5 | Example 6 |
|---|---|---|---|---|---|---|---|
| Microporous layer | Basis weight [g/m²] | 15 | 15 | 15 | 15 | 15 | 15 |
| | Coating liquid | Coating liquid 1 | Coating liquid 4 | Coating liquid 1 | Coating liquid 2 | Coating liquid 5 | Coating liquid 5 |
| | Kneading treatment time (relative value) | 1.0 | 1.0 | 1.0 | 1.0 | 0.7 | 0.5 |
| | Discharge pressure (relative value) | 1.0 | 1.0 | 1.5 | 1.5 | 1.5 | 1.5 |
| Gas diffusion electrode | Basis weight [g/m²] | 57 | 57 | 57 | 57 | 57 | 57 |
| | Percentage of circular fine pores [%] | 54 | 80 | 55 | 58 | 59 | 64 |
| | Percentage of large fine pores oriented in perpendicular direction [%] | 35 | 30 | 44 | 45 | 45 | 51 |
| | Large pore density [number of pores/μm²] | 0.13 | 0.14 | 0.14 | 0.17 | 0.20 | 0.32 |
| | Volume percentage of large fine pores $V_{(0.5-10)}/V_{(0-10)}$ | 25 | 26 | 27 | 35 | 44 | 45 |
| | Surface condition of microporous layer | Satisfactory | Satisfactory | Satisfactory | Satisfactory | Satisfactory | Satisfactory |

TABLE 2-continued

| Power generation performance | Output voltage (@30% RH 2 A/cm²) [V] (Index of dry-up resistance) | 0.39 | 0.41 | 0.39 | 0.42 | 0.43 | 0.45 |
|---|---|---|---|---|---|---|---|
| | Output voltage (@100% RH 2 A/cm²) [V] (Index of flooding resistance) | 0.33 | 0.32 | 0.35 | 0.35 | 0.38 | 0.39 |

| | | Example 7 | Example 8 | Example 9 | Example 10 | Comparative Example 1 | Comparative Example 2 |
|---|---|---|---|---|---|---|---|
| Microporous layer | Basis weight [g/m²] | 15 | 15 | 15 | 15 | 15 | 15 |
| | Coating liquid | Coating liquid 5 | Coating liquid 3 | Coating liquid 3 | Coating liquid 6 | Coating liquid 5 | Coating liquid 6 |
| | Kneading treatment time (relative value) | 0.3 | 1.0 | 1.0 | 1.0 | 1.0 | 1.0 |
| | Discharge pressure (relative value) | 2 | 1.8 | 1.8 | 1.5 | 1.0 | 1.0 |
| Gas diffusion electrode | Basis weight [g/m²] | 57 | 57 | 57 | 57 | 57 | 57 |
| | Percentage of circular fine pores [%] | 65 | 65 | 64 | 50 | 39 | 42 |
| | Percentage of large fine pores oriented in perpendicular direction [%] | 72 | 51 | 50 | 42 | 30 | 35 |
| | Large pore density [number of pores/μm²] | 0.35 | 0.37 | 0.36 | 0.21 | 0.12 | 0.20 |
| | Volume percentage of large fine pores $V_{(0.5\text{-}10)}/V_{(0\text{-}10)}$ | 59 | 67 | 75 | 36 | 15 | 28 |
| | Surface condition of microporous layer | Satisfactory | Satisfactory | Satisfactory | Roughened surface | Satisfactory | Roughened surface |
| Power generation performance | Output voltage (@30% RH 2 A/cm²) [V] (Index of dry-up resistance) | 0.45 | 0.44 | 0.41 | 0.39 | 0.35 | 0.35 |
| | Output voltage (@100% RH 2 A/cm²) [V] (Index of flooding resistance) | 0.41 | 0.40 | 0.37 | 0.33 | 0.28 | 0.25 |

DESCRIPTION OF REFERENCE SIGNS

1: Microporous layer
2: Conductive porous substrate
3: Large fine pores
4: Penetration of microporous layer into conductive porous substrate
5: Elliptical approximate shape of cross section of fine pore
6: Major axis of elliptical approximate shape
7: Minor axis of elliptical approximate shape
8: In-plane direction
9: Orientation angle θ
10: Thickness of conductive porous substrate
11: Thickness of microporous layer
12: Thickness of gas diffusion electrode
13: Maximum point of brightness distribution
14: Side where brightness decreases from maximum point of brightness distribution
15: Inflection point in middle of shoulder of brightness distribution on side where brightness decreases from maximum point

The invention claimed is:

1. A gas diffusion electrode comprising:
a conductive porous substrate; and
a microporous layer containing conductive fine particles and provided on at least one surface of the conductive porous substrate,
the gas diffusion electrode having, based on a number of fine pores having an area of 0.25 μm² or more that are observed in a cross section of the microporous layer in a thickness direction, a percentage of fine pores having a circularity of 0.5 or more of 50% or more and 100% or less.

2. The gas diffusion electrode according to claim 1, having, based on the number of the fine pores having the area of 0.25 μm² or more that are observed in the cross section of the microporous layer in the thickness direction, a percentage of fine pores having an angle θ of 45° or more and 90° or less of 40% or more and 100% or less,
wherein the angle θ is an angle between a major axis direction of an ellipse obtained by approximating each of the fine pores having the area of 0.25 μm² or more, and an in-plane direction of the gas diffusion electrode.

3. The gas diffusion electrode according to claim 1, having a number density of fine pores having an area of less than 10 μm² among the fine pores having the area of 0.25 μm² or more of 0.15/μm² or more in the microporous layer.

4. The gas diffusion electrode according to claim 1, wherein in the microporous layer, a sum of volumes of fine pores having a fine pore diameter of 0.5 μm or more and less than 10 μm is 30% or more and less than 70% of a sum of volumes of fine pores having a fine pore diameter of less than 10 μm.

5. The gas diffusion electrode according to claim 1, wherein the conductive fine particles contained in the microporous layer have a primary particle size of 0.3 μm or less.

6. A method for manufacturing the gas diffusion electrode according to claim 1, the method comprising:
orienting a major axis direction of a pore-forming agent in a direction perpendicular to a surface of the conductive porous substrate during application of a coating liquid for forming the microporous layer, that is, a microporous layer forming coating liquid,
wherein the microporous layer forming coating liquid contains a vanishing material as the pore-forming agent, and the vanishing material has a carbonization yield of 20% or less and an aspect ratio of 10 or less.

7. The method according to claim 6, wherein the vanishing material is any one of an acrylic resin, a styrene resin, starch, cellulose, a polylactic acid resin, a sublimable low molecular weight substance, and a microballoon.

8. A membrane electrode assembly comprising the gas diffusion electrode according to claim 1.

9. A fuel cell comprising the membrane electrode assembly according to claim 8.

* * * * *